United States Patent [19]
Dushane et al.

[11] Patent Number: 6,134,134
[45] Date of Patent: *Oct. 17, 2000

[54] THERMOSTAT VOLTAGE ADAPTER

[76] Inventors: Steve Dushane, 17170 Los Alimos St., Granada Hills, Calif. 91344; Terry Zimmerman, 10810 Springfield, Northridge, Calif. 91325; Grant Bohm, 19540 Sherman Way #404, Reseda, Calif. 91335

[*] Notice: This patent issued on a continued prosecution application filed under 37 CFR 1.53(d), and is subject to the twenty year patent term provisions of 35 U.S.C. 154(a)(2).

[21] Appl. No.: 09/063,512

[22] Filed: Apr. 21, 1998

[51] Int. Cl.$^7$ ..................................................... H02M 7/04
[52] U.S. Cl. ........................... 363/143; 165/259; 165/26; 236/38; 236/78 B
[58] Field of Search ............................ 363/143; 165/259, 165/26, 50; 236/1 C, 37, 38, 78 A, 78 B

[56] References Cited

U.S. PATENT DOCUMENTS

| | | | |
|---|---|---|---|
| 3,616,846 | 11/1971 | Wills | 165/26 |
| 4,411,385 | 10/1983 | Lamkewitz | 237/2 A |
| 4,433,368 | 2/1984 | Choi | 363/45 |
| 4,632,304 | 12/1986 | Newell, III et al. | 236/46 R |
| 4,948,044 | 8/1990 | Cacciatore | 236/46 R |
| 5,319,533 | 6/1994 | Reynolds et al. | 363/143 |
| 5,383,109 | 1/1995 | Maksimov et al. | 363/143 |
| 5,446,641 | 8/1995 | Reynolds et al. | 363/143 |
| 5,592,989 | 1/1997 | Lynn et al. | 165/259 |

*Primary Examiner*—Peter S. Wong
*Assistant Examiner*—Bao Q. Vu
*Attorney, Agent, or Firm*—David T. Bracken

[57] ABSTRACT

The present invention is a voltage adapter for a low voltage thermostat which permits the following input voltage ranges:

100–132 VAC/50 or 60 Hz,

200–264 VAC/50 or 60 Hz, and

265–330 VAC/50 or 60 Hz maintaining an output of at or just effectively about 24 VAC.

10 Claims, 9 Drawing Sheets

(1 OF 3)

(2 OF 3)

(3 OF 3)

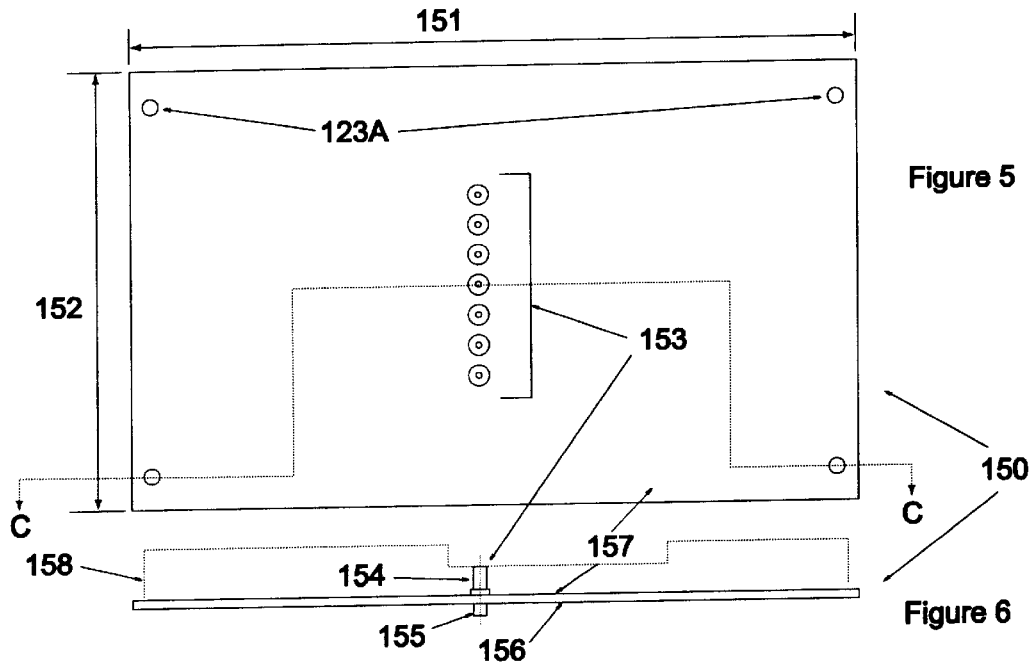
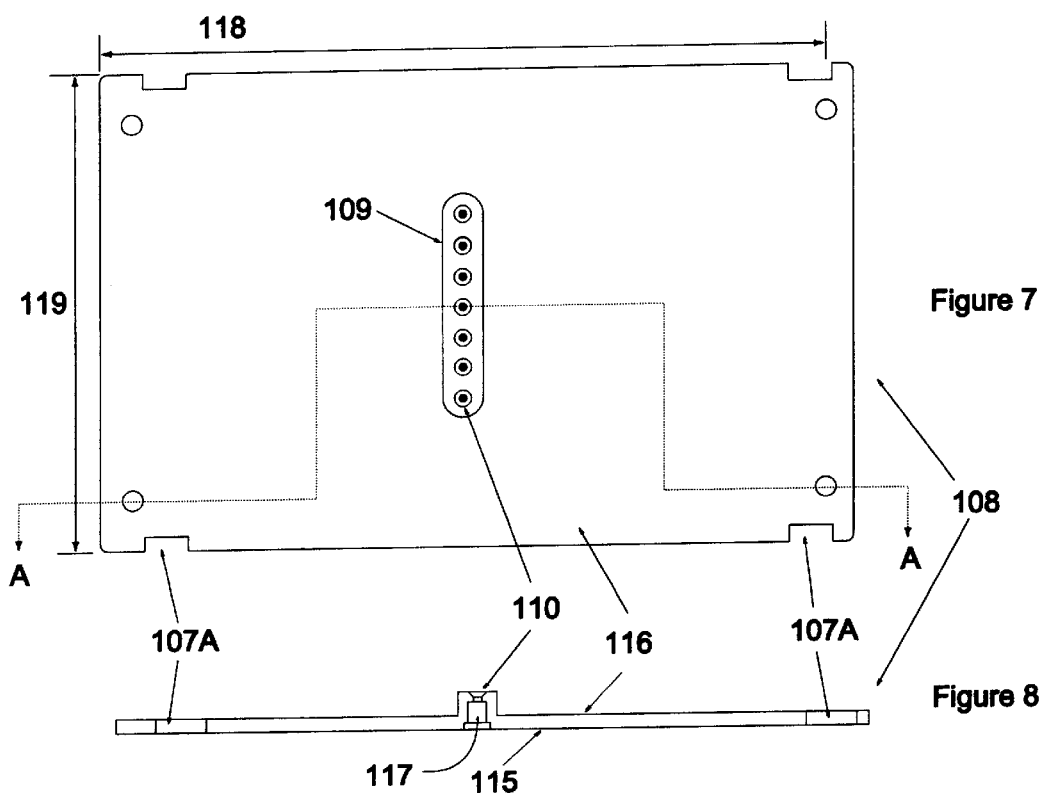

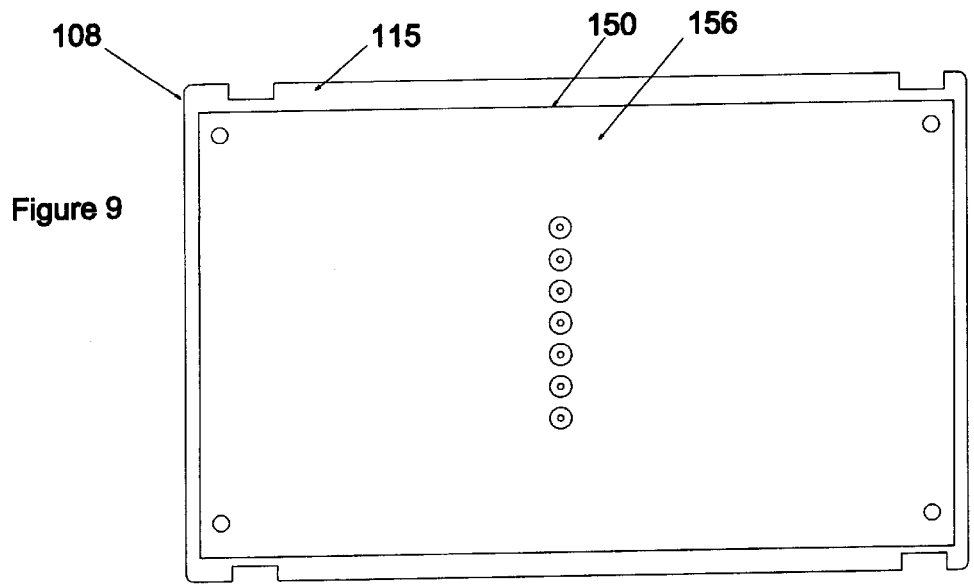
Figure 9
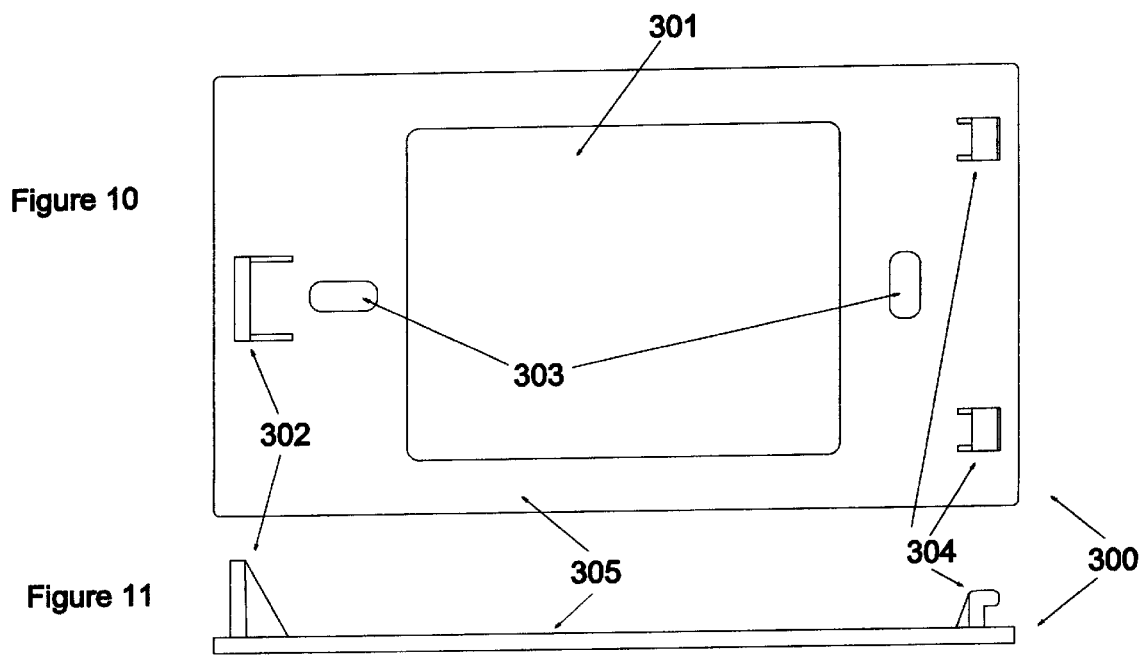
Figure 10
Figure 11

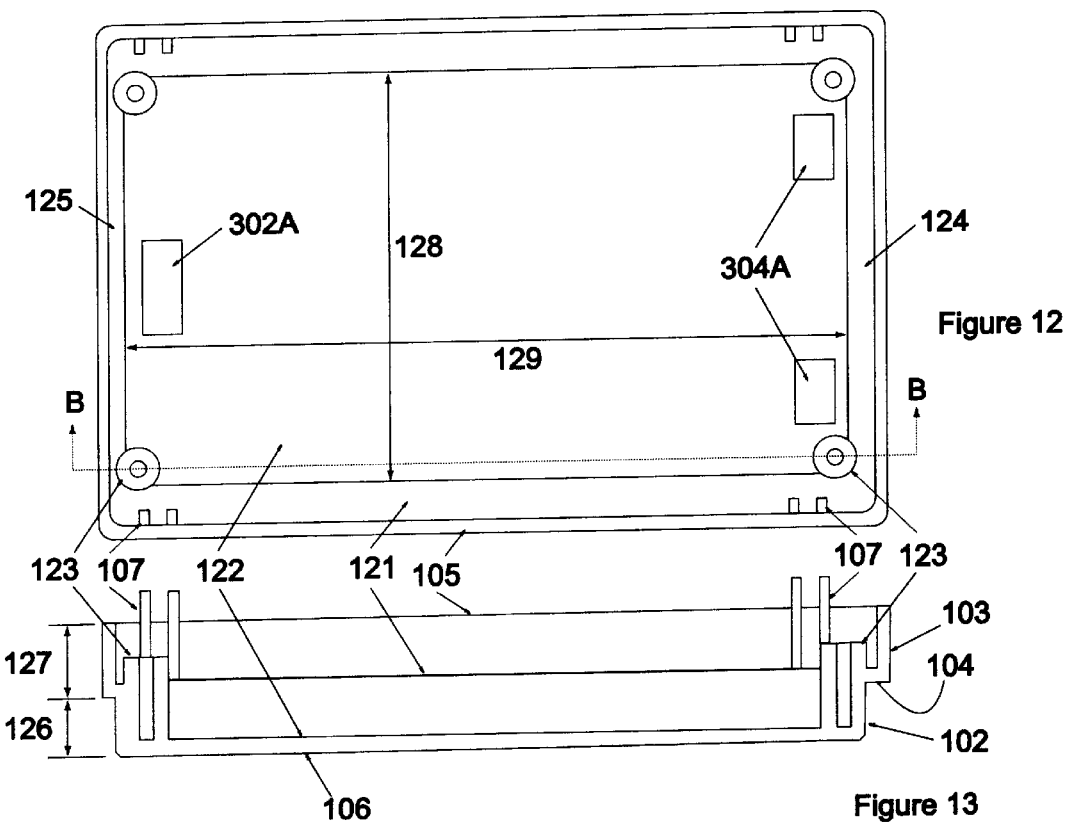
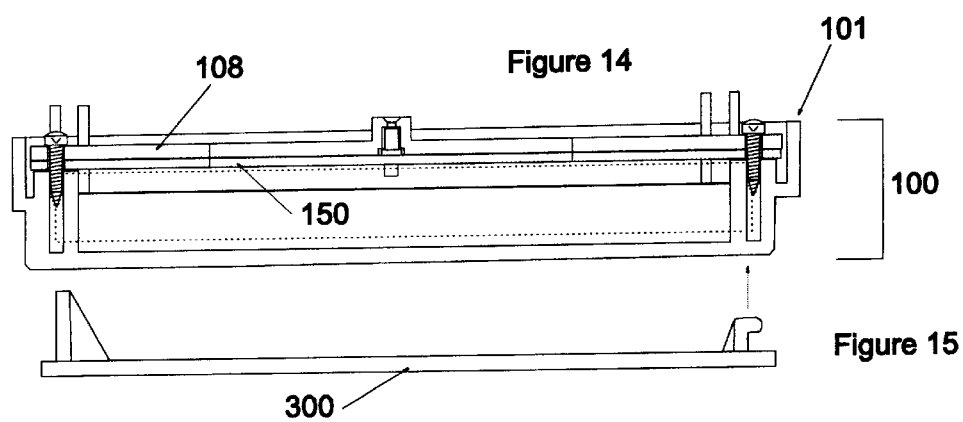

THERMOSTAT VOLTAGE ADAPTER

BACKGROUND OF THE INVENTION

The present invention relates to a line voltage adapter for a thermostat of a type for receiving an extremely wide range of input voltages.

It has been known in the art to require thermostat control of a wide range of devices with widely variable operating voltages, at 60 Hz in the United States and 50 Hz in Europe or other locations. An attempt in the prior art to deal with the problem of arranging separate low and higher voltage devices is described in U.S. Pat. No. 5,592,989, wherein is described a circuitry and assembly for location of a voltage control device. An electronic thermostat having high and low voltage control capability and varied functional capabilities. The thermostat is particularly suited for use with fan coil heating and cooling units. Specifically the thermostat uses relays to actuate external devices such as heating and cooling equipment, fans and dampers. The use of relays permits control voltages for these external devices to be different (e.g. 24 VAC, 208–230 VAC or 277 VAC).

Overriding the circuit design considerations to accomplish the goal of wide range voltage adaptation are the Underwriter Laboratories' ratings requirements relating to heat transfer, fire resistance and pull strength for wire connections. Regardless of the design and configuration of the potentially several separately powered units related to control space heating and cooling, a thermostat is necessary to control the operation of each unit separately. Because of the varied operational characteristics that are possible, a single thermostat design has heretofore not been available which can operate the entire spectrum of the separate devices or units that are commercially available. It is known that because of the different operating voltages that are available, Underwriter Laboratories compliance specifications have resulted in thermostats being separated from control relays and the like, and this has caused increased costs to users because of the necessity for installing switches, relays and associated controls that are separated from the thermostat.

Accordingly, it is a primary object of the present invention to provide an improved voltage adapter for a thermostat for controlling heating and cooling related equipment with the widest range of voltages and with respect to the two primary available line frequencies at 50 and 60 Hz. It has been heretofor unknown to combine such advantages in a single voltage adapter unit which is incorporable into or next to the housing of the thermostat.

SUMMARY OF THE INVENTION

The present invention is a voltage adapter for a thermostat which permits the following input voltage ranges:

100–132 VAC/50 or 60 Hz,

200–264 VAC/50 or 60 Hz, and

265–330 VAC/50 or 60 Hz

With six circuit designs different from each other with respect to the ratings of just two identical capacitors while maintaining an output of at or just effectively less than 24 VAC. The specific example described herein describes ratings of those changed components for the requirements of an especially advanced programmable thermostat having a reduced power requirement, although the teaching of provided in the specific description will inform the skilled person of appropriate adaptations needed for the power requirements of less efficient thermostats.

The UL specifications for voltage adapters for and in close mounting with wall thermostats has led the skilled person of the prior art to propose only transformers as the primary means of reducing high line voltage to the desired output of 24 VAC. The present invention eliminates the need for such a component that comprises a substantial space requirement. The present invention uses the enclosed case for the voltage adapter board as the high voltage/low voltage isolation means required by UL specifications, whereby such specifications are described in U.S. Pat. No. 5,592,989. The test results disclosed below show successful operation within component temperature limits for line voltage adapters for wall thermostats. The optimized selection and assembly of electrical components and supporting and enclosing devices described below comprises a highly compact and easily installed device, although other case sizes, component arrangements and ratings, relative distances of components from the case surfaces and other aspects may be changed and still obtain the objects of the present invention.

BRIEF DESCRIPTION OF THE DRAWINGS

FIGS. 5 and 6 are respectively a top and side view of the adapter board, wherein the side view shows a general component profile of the actual mounted components of the present invention.

FIGS. 7 and 8 are respectively a top and side view of a top plate that encloses the adapter board within an adapter case.

FIG. 9 shows a view of the adapter board shown in operative association with the top plate for mounting within the adapter case.

FIGS. 10 and 11 are respectively a top and side view of a mounting plate for the adapter case.

FIGS. 12 and 13 are respectively a top and cutaway side view of the adapter case.

FIG. 14 is a cutaway side view of an assembled line voltage adapter assembly comprising the top plate in association with the adapter board as in FIG. 9, the top plate enclosing the adapter board within the adapter case, also wherein is shown the wall mounting plate in close association with the back of the adapter case.

FIG. 15 is the view of FIG. 11.

DETAILED DESCRIPTION OF THE INVENTION

Figure 1:
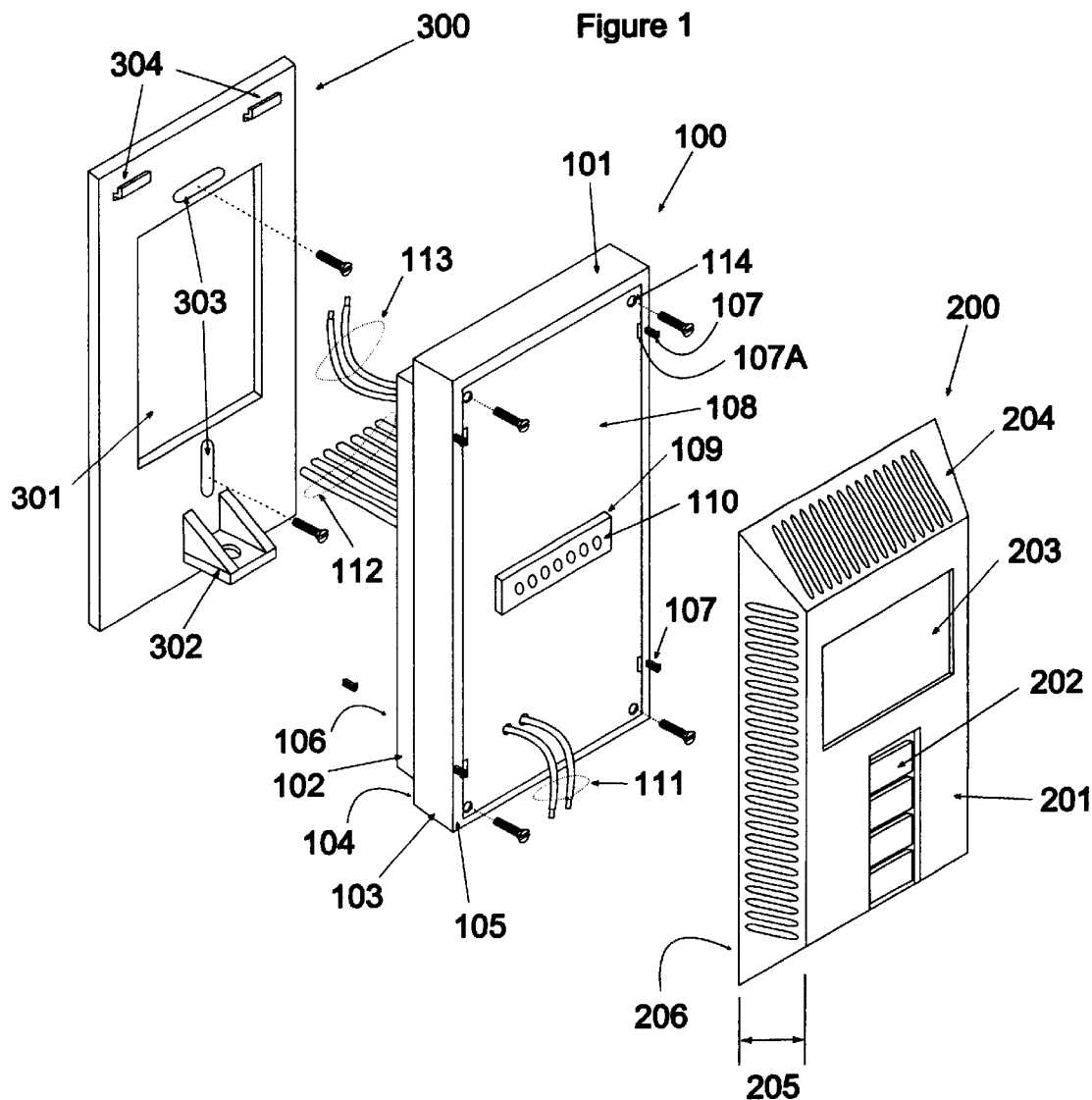
FIG. 1 an exploded isometric view of the mounting plate, line voltage adapter assembly and thermostat case.

The line voltage adapter of the present invention is now discussed with reference to the figures, wherein the same aspect item numbers in different figures represent substantially the same aspect. In FIG. 1, line voltage adapter assembly 100 is shown with the adapter case 101 with an inner cavity enclosed by the top plate 108, the same in fully assembled form to be held in place with the screws shown to be driven into adapter plate 101 through screw holes 114. The adapter case 101 comprises lower adapter case 102 with a smaller rectangular cross section than the upper adapter case 103, the two being joined by wallboard face 104. The combination of cases 102 and 103 and face 104 is preferably adapted to provide insertability of case 102 into a wallboard or wall cutout with case 103 being slightly larger than the cutout to provide a pleasing appearance to the viewer after installation. Mounting plate face 106 is a substantially solid back plate of adapter case 101 which is adapted to securely mount to mounting plate 300 at lugs 302 and 304.

Mounting plate 300 is further provided with cutout 301 to provide pass through access to the face 106 for hot and neutral wires 113 and relay wires 112. Wires 112 and 113 are high voltage wires, comprising connections to relays within assembly 100, such that the relays found therein provide on-off switching for any of several high voltage devices used for heating, cooling, heat pumping or ventilation of a space whose temperature is to be controlled by a thermostat in thermostat case 200. Slots 303 of mounting plate 300 are intended to provide standard screw securement slots for mounting the mounting plate 300 to the open face of a junction box approved for high voltage wiring connection.

Top plate 108 comprises a rectangular, substantially solid plate with another plate 109 integral therewith, the two plates 108 and 109 having holes 110 passing through them to provide pin access for electrical connection from a programmable thermostat contained within thermostat case 200 to the components on the adapter board contained within assembly 100. Additional holes are provided for wires 11 for electrical connection between the programmable thermostat and the components of the adapter board for making dry contact switching of an appropriate device. Four cutouts 107A are provided in plate 108 to accommodate assembly therefor with the adapter case 101, such that the four sets of lugs 107 extending generally from the inside surface of upper adapter case 103 do not interfere with the enclosing assembly of plate 108 over the cavity of adapter case 101.

Thermostat case 200 is a well known design in the art of programmable thermostats produced by the Venstar Corporation, enclosing and securely supporting a programmable thermostat product known thereby as a Model 250 with extensive programming capabilities.

That model has been efficiently provided with power and control access to external devices through a seven pin assembly mounted on the non-component, backward facing surface of the thermostat printed circuit board. Thermostat case 200 is provided with vents 204 along the sides and top of the case 200 to permit convective passage of heat from the components upward while drawing ambient temperature air over the temperature sensing device located at a relatively lower position on the thermostat board. The actual height profile 205 of case 200 is extremely low as compared with industry standards, while provided for the user a digital display 203 and input access/information scrolling display buttons 201 on a front face 201 with a rectangular face area measurably less that presented by the rearward opening of the thermostat case 200, the perimeter of which is defined by thermostat backward facing edge 206.

The completely assembled group of the thermostat case 200, line voltage assembly 100 and mounting plate 300 comprises pressing lugs 107 toward latchable receiving cavities or cutouts on or near edge 206, thereby forcing electrical connection pins of the thermostat board (not shown) into holes 110 (after having made appropriate connection of wires 111 with the connections on the thermostat board and bringing into substantial isolation contact edges 105 and 206. The mounting plate 300, with wires 112 and 113 appropriately extended through cutout 301, is then brought into hangable and latching engagement with face 106, whereby the mounting plate has previously been attached to a junction box. The completely assembled group of these three devices comprises an especially low profile combination which effectively meets or exceeds UL specifications for line voltage adapters. Plates 300 and 108 and cases 101 and 200 are preferably comprised of a temperature appropriate polymer moldable to the shapes and aspects described herein with respect to the below described test results for component temperatures during testing of the present invention.

With respect to FIGS. 2, 3 and 4, the electrical components are shown with preferred ratings or specifications below the component label. The component labels are designated with an "R" for resistors (whereby the rating is shown in Ohms), a "C" for capacitors, a "D" for diodes, a "K" for relays, an "ISO" for iso-optical coupler, a "Q" for transistors, a "U" for integrated circuits, an "L" for inductors, a "Y" for resonators, a "T" for transformers, an "S" for switches, and other appropriate designations as are well known in the art.

Figure 2:
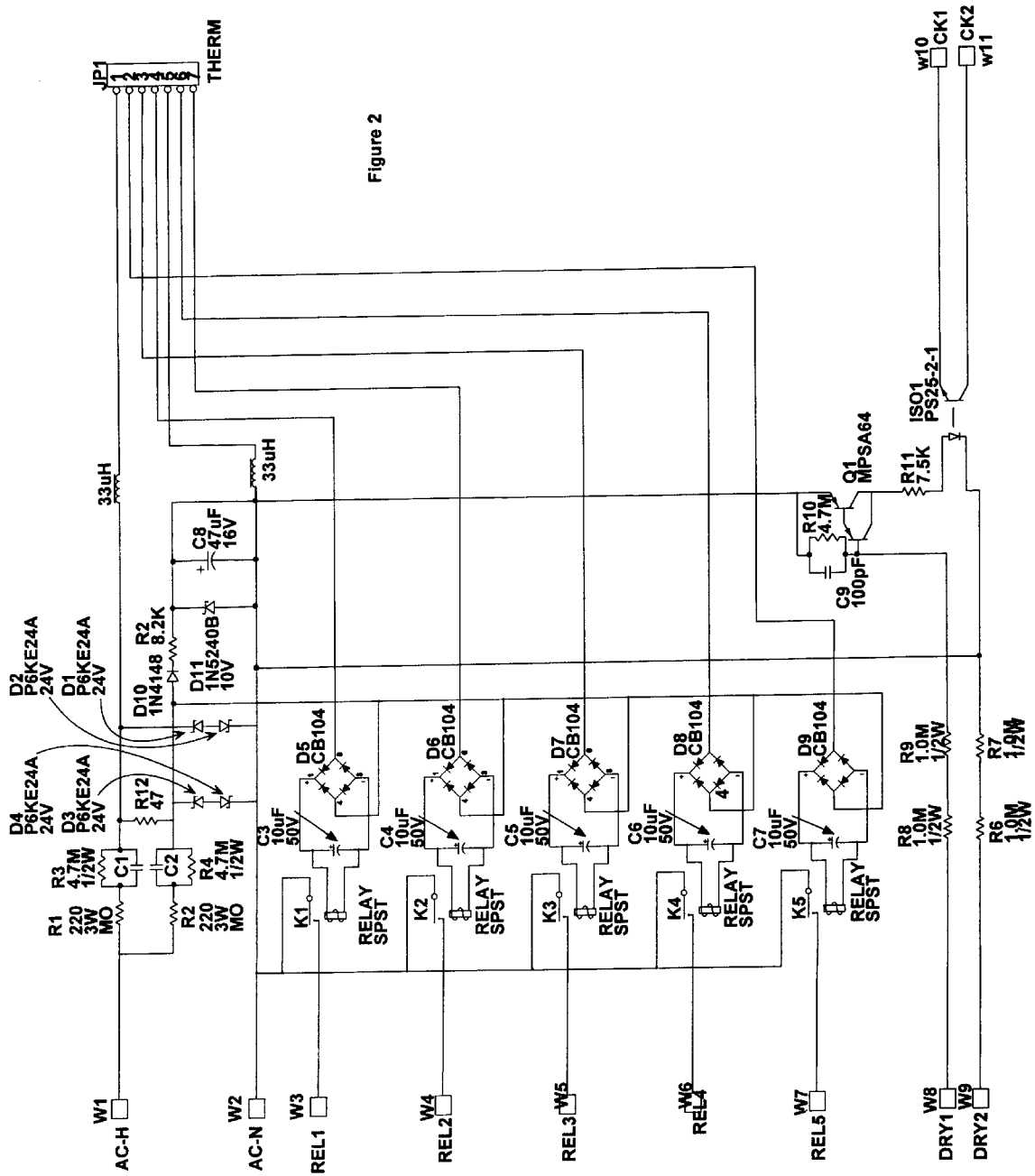
FIG. 2 is a schematic diagram of line voltage/thermostat adapter of the present invention.
Figure 3:
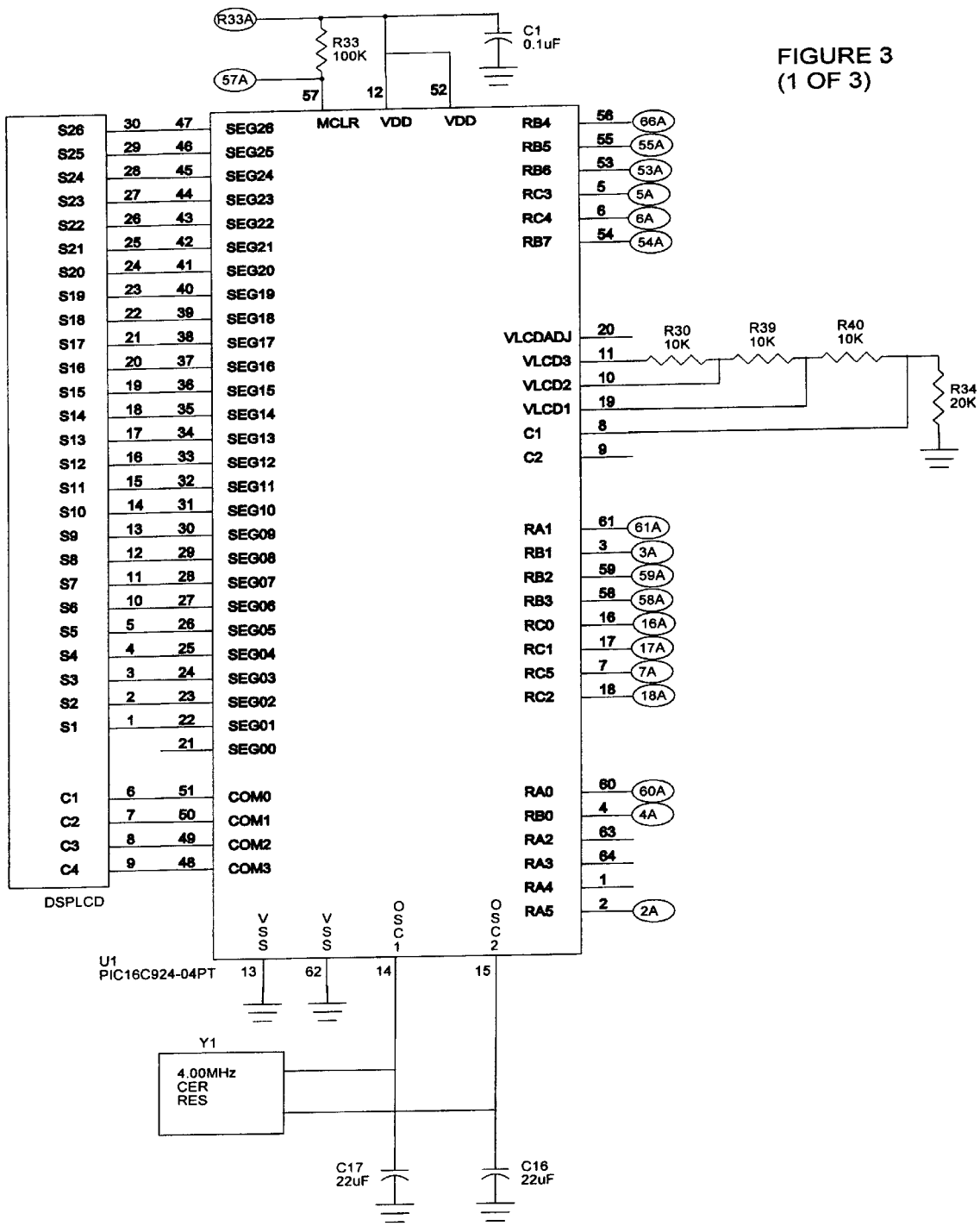
FIG. 3 is a schematic diagram of the preferred embodiment of a programmable thermostat electrically connected with the line voltage/thermostat adapter output and relay output.
Figure 3:
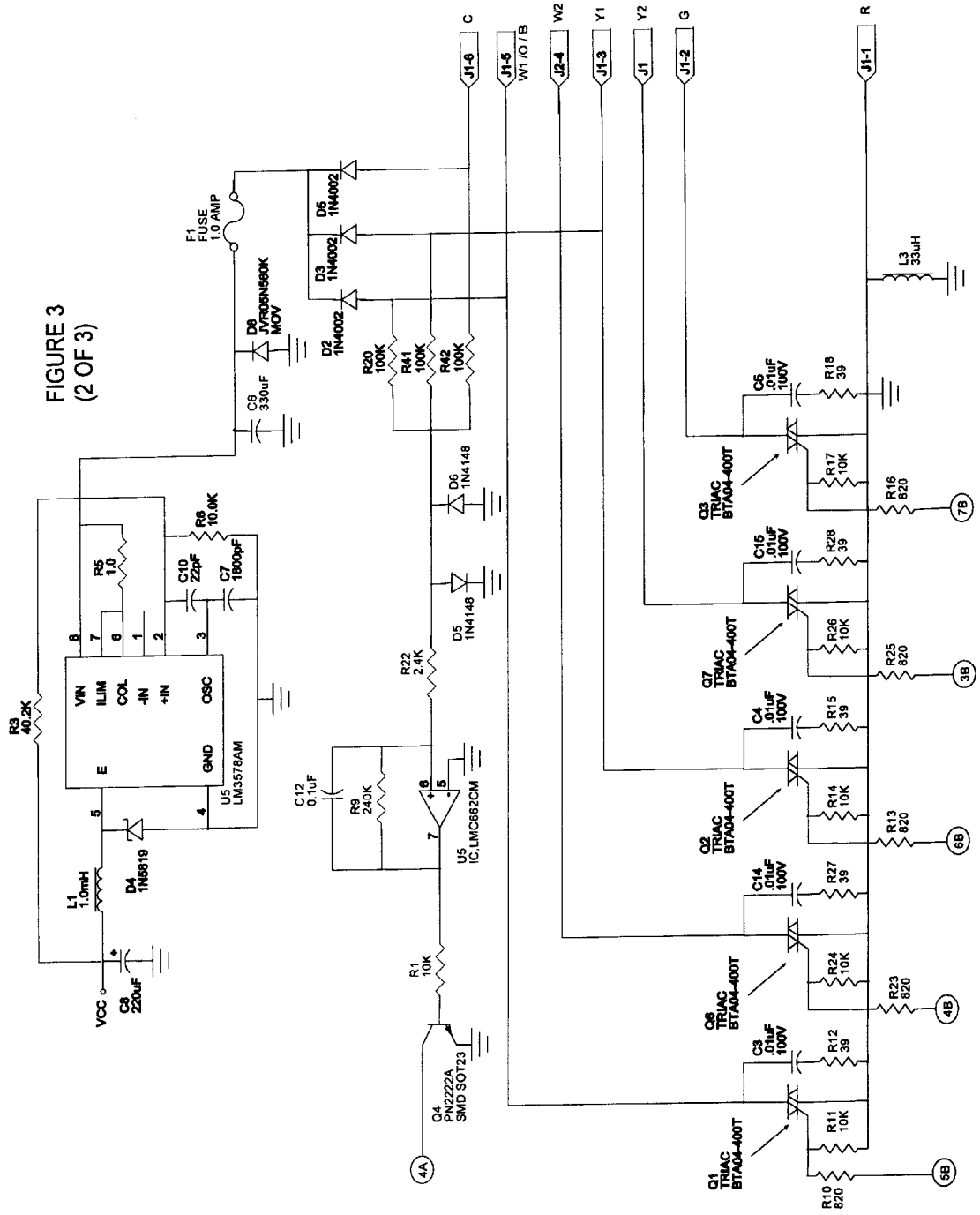
Figure 3:
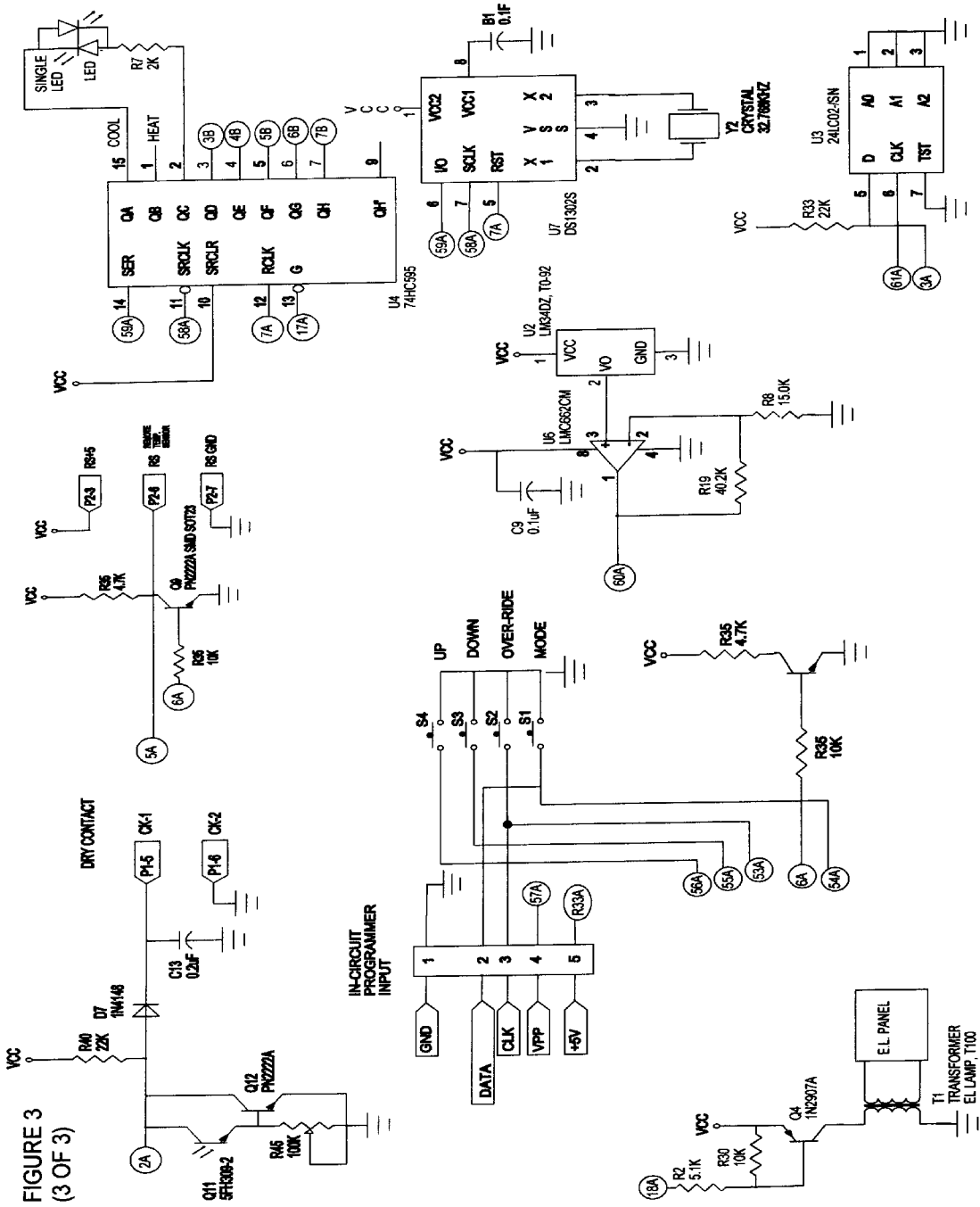

The line voltage adapter circuit of FIG. 2 comprises a resistive/capacitive voltage adaptation instead of a transformer as taught in the prior art for close association with a temperature sensing thermometer, which must as well meet UL specifications for providing a separation barrier between the low voltage (24 VAC) and high voltage (typically above 120 VAC) sections of the device operable to sense a temperature and control high voltage devices thereby. The present invention meets this requirement by effectively enclosing the devices shown in FIGS. 2 and 4 within a cavity comprising a case and a cover. It will be appreciated from FIG. 4 that capacitors C1/C2 and resistors R1/R2/R3/R4/R12 with the Zener diodes shown comprise the primary voltage and current changing aspects of the present invention. The following table describes preferable ratings for capacitors for the line voltages shown thereby:

| Line Voltage | Capacitor Specification/Rating |
|---|---|
| C1,C2/100–132 VAC, 60 Hz | 1.0 uF 400 V |
| C1,C2/200–264 VAC, 60 Hz | 0.47 uF 630 V |
| C1,C2/265–330 VAC, 60 Hz | 0.39 uF 630 V |
| C1,C2/100–132 VAC, 50 Hz | 1.2 uF 400 V |
| C1,C2/200–264 VAC, 50 Hz | 0.56 uF 630 V |
| C1,C2/265–330 VAC, 50 Hz | 0.47 uF 630 V |

It was found that when capacitors C1 and C2 were specified with about a 30–40% lower value and three relays were activated simultaneously, the line voltage adapter output voltage sagged from 24 VAC to below 14 VAC at low line input voltage conditions. The component value changes given in the table above result in increased operating temperature of R1, R2, D1, D2, D3, and D4. Temperature measurements under worst case conditions (maximum line voltage with minimum thermostat current draw) have shown that the present invention component temperatures were still within acceptable limits.

Figure 4:
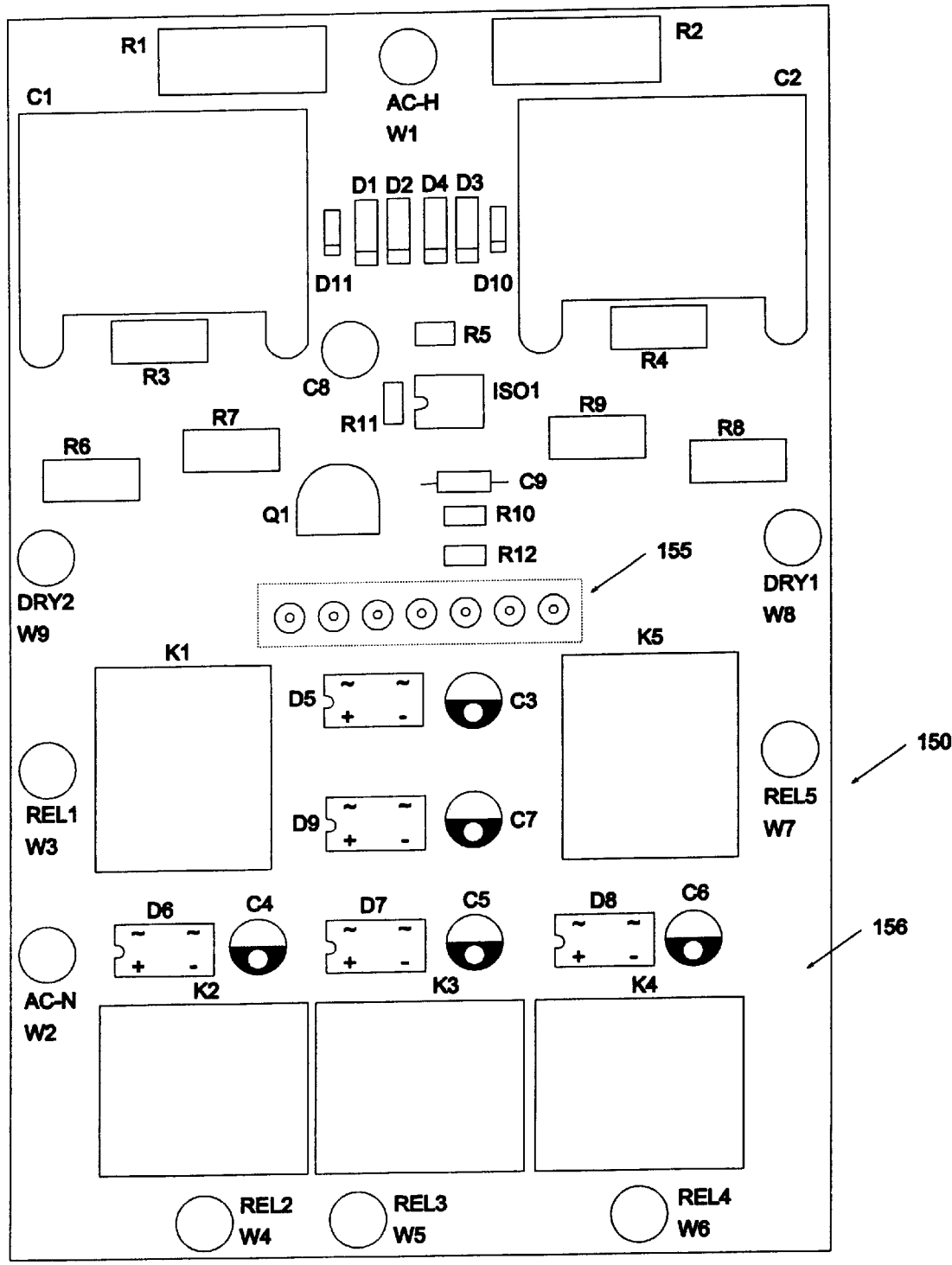
FIG. 4 is a top view of the adapter board of the present invention on which are shown the mounted components shown schematically in FIG. 2.

As can be seen by the above table, an extremely wide range of voltages can be accommodated to perform the relay switching and thermostat powering functions with replacement of two identical capacitors in the circuit of FIG. 2 as shown in FIG. 4. This enables the production cost reduction by elimination of transformers with relatively lower cost components at a substantial reduction in space. In FIG. 2, the seven connections identified as "THERM" correspond the pin receivers beneath the holes 110 for electrical connection to the appropriate thermostat connections designated as "R" for connection "1", "C" for connection "5" and the rest of the connections "2"–"4", "6" and "7" may take appropriate connection to the remaining "G", "W1/O/B", "W2", "Y1" or "Y2". The triacs shown in FIG. 3 are used in combination with the relays of FIG. 2 to switch high voltage devices on or off.

The thermostat electronics are described below with the understanding that they are generally illustrative of a low power programmable thermostat. Several aspects of the thermostat electronics are not described in detail, being understood by the skilled person with reference to FIG. 3, to comprise an optimized version of such a device. It is intended that the description herein for line voltage adaptation extend to other less sophisticated, higher power devices generally with a desired input voltage of 24 VAC.

In accordance with a specific illustrative embodiment of the thermostat workable with the voltage adapter of the present invention, a programmable digital thermostat includes a user input mechanism adapted to receive programming inputs from users, to have a display adapted to display indicia of the programming inputs, a controller adapted to be programmable in response to the input signals according to a plurality of programming modes and to generate and provide control signals to one or more environmental control apparatuses. The controller is adapted to facilitate automatic adjustments in control variables associated with at least one of the programming modes.

A display DSPLCD, corresponding to display 203 comprises for example, a liquid crystal display with a Thermoglow backlight. A plurality of user input mechanisms which, in the exemplary illustrated embodiment, comprise an indicator light "SINGLE LED" and buttons S1–S4. The interactive programming aspects of the present invention are implemented via the aforementioned user input mechanisms and are described below in greater detail.

Some of the input signals are processed by the programming circuitry and others are supplied to the display DSPLCD. The user inputs, as determined by actuations of the user input mechanisms, are provided to the FIG. 3 electronics. The user inputs may also be provided to microprocessor U1, a temperature sensor U2, buttons S1–S4 (corresponding to buttons 202 of FIG. 1), a lamp SINGLE LED. The display DSPLCD includes a liquid crystal display 203 which is electrically connected to the microprocessor U1 as shown. A crystal Y2 and a ceramic resonator Y1 are also electrically connected to the microprocessor U1 as shown. The crystal Y2 preferably operates at 32.768 kHz and the ceramic resonator preferably resonates at 4.00 MHz. As may be readily appreciated, other timing or clocking schemes can be employed.

The microprocessor U1 is also electrically connected to the temperature sensor U2 via a microprocessor U6. The lamp EL PANEL is electrically connected to the microprocessor U1 via a transistor Q4 and a transformer T1 as shown. The integrated circuit U3 is connected to U1 as shown.

The thermostat may include various combinations of environmental control apparatuses selected from a group comprising, for example, a heater, an air conditioning unit, a fan and heat pump. In the illustrated embodiment, the microprocessor U1 is programmable to expect an electric heat data bit and a heat pump data bit and, in a thermostat including an electric heater and a fan, a data bit is set such that the fan turns on instantly when heat is called for. In a thermostat including a single stage heat pump, a data bit is set such that the control signals generated by the microprocessor U1 are appropriately modified to accommodate a fan, compressor and reversing valve. Thus, another aspect of the present invention is the configurability of the thermostat. It should be appreciated that the thermostat can be modified to control additional and/or other apparatuses and devices such as a two-stage heat pump can be alternatively employed. Exemplary operating modes for the thermostat are discussed below in greater detail.

As shown in FIG. 2, the electronics also include control signal terminals R, C, W1/O/B, W2, Y1, Y2 which are electrically connected to the environmental control apparatuses mentioned above. More specifically, the terminal G provides a fan control signal. The terminal Y1 provides a cooling control signal. The terminal W1 provides a heating control signal. The terminal C provides a common or ground connection. The scope of the present invention also includes the provision of additional or different control signal terminals depending upon the nature of the apparatuses or devices to be controlled.

The thermostat electronics preferably include protection circuitry designed in consideration of the interface between the microprocessor U1 and the devices to be controlled thereby. Such protection circuitry includes the switching regulator U5 as well as the discrete circuit elements which include, but are not limited to, triacs Q1–3, 6, 7. The thermostat electronics are powered by a power source through the line voltage adapter available at the region to be controlled.

As described above, the thermostat of FIG. 3 is connectable to the line voltage adapter of FIG. 2. The inputs to the bridge rectifier/relay combinations of FIG. 2, items D5–9/ K1–5, complete high voltage circuits to outputs REL 1–5, connected to appropriate heating, cooling or fan apparatus. FIGS. 5 and 6 show the component free (except for pin connections 153, corresponding to connections 1–7 of FIG. 2) circuit board of FIG. 4. Width 152 is about 2.9 inches and length 151 is about 5.6 inches. Pin connections 153 comprise component side section 155 on component side 156 and continues through to non-component side section 154 on non-component side 157. FIG. 6 is a side view of section CC of FIG. 5, further showing a general side view of component profile 158, within which the components of FIG. 4 lie and which for the present embodiment has a height of 0.55 inches. Holes 123 are arranged to permit securement of the board 150 within the cavity of adapter case 101.

Top plate 108 is shown in FIGS. 7 and 8, FIG. 8 being a side view of top plate 108 at section AA. Pin plate 109 is shown with pin holes 110 on upper face of top plate 108, which face preferably opposes a component holding side of the circuit board for the thermostat electronics of the thermostat contained in thermostat case 200. Width 119 and length 118 are appropriately sufficiently greater than those of board 150 such that as shown in FIG. 9 the edges of board 150 lie between the notch sections 107A and the ends of board 108. FIG. 8 shows a cross section of a pin hole 110, wherein a larger cavity 117 is reduced to a hole at the top of plate 109, such that cavity 117 is adapted to securingly receive section 154 when side 157 of board 150 is facingly opposed with side 115 of plate 108 in the assembled position.

FIGS. 10 and 11 show mounting plate 300 in a top and side view to better show the opening 301 which is adapted to pass through it to a junction box the high voltage wiring 113 and 112 of the present invention. Lugs 304 and 302 permit a downward "hooking" attachment of face 106 of adapter case 101 to face 305 of mounting plate 300.

Adapter case 101 is shown in FIGS. 12 and 13 in top and cutaway side views, the side view being that of section BB. As described above for FIG. 1, the adapter case 101 is made with a lower case 102 and an upper case 103 joined by face 104. It will be appreciated in FIG. 13 that face 104 may be made sufficiently wide to cover a wall board cutout, into which may be inserted lower case 102 up to face 104. The just described insertion leaves a rectangular box section above the wallboard face with a height 127 of about 0.61 inches, wherein height 126 is about 0.47 inches. It is a critical improvement over the prior art to have provided an enclosed adapter case with a small clearance between the heat generating components of the line voltage adapter and the adapter case, such closeness being provided in the adapter case 101 by a height from the flat top of extension 123 to bottom face 122 of case 101 at about 0.66 inches, thereby leaving a clearance in this embodiment of about only 0.1 inches between the component profile and the bottom face 122 when the assembly 100 is assembled. Inside length 129 is about 5.6 inches and inside width is about 3.3 inches. Face 121 is the inside section of wallboard face 104. Openings 302A and 304A in face 106 comprise the insertion slots for lugs 302 and 304 respectively.

Assembly 100 is shown in cutaway side view of the plate 108, board 150 and case 101 as shown in FIGS. 6, 8, 11 and 13 in a fully assembled position. Boards 108 and 150 are secured in position by screws. The broken line of FIG. 14 generally shows the highest component profile of the line voltage adapter components of FIGS. 2 and 4. Mounting plate is shown in side view with a directional arrow for mounting positioning. Although not shown, the skilled person will appreciate that pin extensions from a circuit board accommodating the thermostat electronics will extend through holes 100 to make electrical connection with the components of board 150 and thereby effect the line voltage adaptation of the present invention.

The fully assembled thermostat in thermostat case 200, assembly 100 and mounting plate 300 were tested to meet UL specifications with the following temperature measurements at the below listed components of FIG. 3 with relay K1 was activated and drove 11.5 A AC through the connected circuit for 1.5 hours:

| Location | |
|---|---|
| Ambient | 19° C. |
| K1 (line interface) | 49° C. |
| C1 (line interface) | 28° C. |
| D5 (line interface) | 29° C. |
| R3 (line interface) | 28° C. |
| Q1 (line interface) | 26° C. |
| Enclosure (thermostat case 200) | 21° C. |

These results indicate that the maximum expected temperatures at the highest temperature components is less than about 55° C. and that the thermostat case temperature is affected very little by very high amperage flow through the line voltage adapter. The present low temperature affect of a closely mounted line voltage adapter has not been demonstrated in the prior art, such close mounting potentially affecting temperature sensing performance of the thermostat. The 2° C. difference in ambient and thermostat case temperature did not significantly affect thermostat performance, as it will be within skill in the art to adapt programming of the thermostat to compensate with additional high temperature dead band when certain time periods elapse wherein high amperage switching has been in operation.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. A line voltage adapter and programmable thermostat comprising:

(a) parallel resistive and capacitive means effectively and directly connected with a voltage source above about 110 VAC for receiving, reducing and outputting line voltage to that required by the programmable thermostat, the reduction comprising reducing an input voltage from about 110 VAC to 330 VAC to an output voltage substantially below 110 VAC from the parallel resistive and capacitive means; and (b) a programmable thermostat effectively and directly connected to receive the output voltage, where the programmable thermostat comprises circuit elements whose operation is substantially adversely affected unless an applied voltage is substantially less than about 110 VAC.

2. The adapter of claim 1 wherein the output voltage required by the programmable thermostat is about 24 VAC.

3. The adapter of claim 1 wherein are provided relay means for making high voltage switching for fan, heating, or cooling apparatus adapted to maintain such relay means below about 55 degrees C. during operation.

4. The adapter of claim 1 wherein parallel resistive and capacitive means and relay means are mounted on an adapter board and are substantially enclosed in an adapter case assembly immediately interposed between high voltage sources and the programmable thermostat such that operation of the programmable thermostat results in a temperature within the adapter case of less than about 49° C. without forced air cooling of the adapter case.

5. The adapter of claim 4 wherein the substantial enclosure of the adapter case effectively eliminates access to the parallel resistive and capacitive means and relay means except for high voltage electrical connections from a high voltage sources to a back side of the adapter case assembly and low voltage electrical connections to a front side of the adapter case assembly.

6. The adapter of claim 5 wherein the adapter case assembly comprises a top plate and an adapter case, the adapter case having a cavity adapted to provide close association of the profile height of the parallel resistive and capacitive means and relay means to inside faces of the front or back side of the adapter case assembly and thereby reduce the thickness of the adapter case assembly.

7. The adapter of claim 6 wherein the profile height of the parallel resistive and capacitive means and relay means is about less than 1.0 inches and the thickness of the adapter assembly is less than about 1.6 inches.

8. The adapter of claim 7 wherein the adapter case comprises a back side corresponding to the back side of the adapter case assembly and a lower case section with a rectangular cross section across its length and width significantly less than an upper case section of the adapter case with a similar rectangular cross section across its length and width, such adaptation provided to make a covering and insertable adapter case for a wallboard cutout for mounting the adapter case assembly to a wall.

9. The adapter of claim 7 wherein the profile height of the parallel resistive and capacitive means and relay means is about less than 0.7 inches and the thickness of the adapter assembly is less than about 1.3 inches.

10. The adapter of claim 7 wherein the profile height of the parallel resistive and capacitive means and relay means is about 0.55 inches and the thickness of the adapter assembly is about 1.1 inches.

* * * * *